United States Patent
Lance et al.

(10) Patent No.: US 11,835,300 B2
(45) Date of Patent: Dec. 5, 2023

(54) SYSTEMS AND METHODS FOR PARTICLE-ENHANCED DRY HEAT REJECTION AND THERMAL STORAGE

(71) Applicant: National Technology & Engineering Solutions of Sandia, LLC, Albuquerque, NM (US)

(72) Inventors: Blake Lance, Albuquerque, NM (US); Clifford K. Ho, Albuquerque, NM (US); Kevin Albrecht, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/618,711

(22) PCT Filed: May 2, 2019

(86) PCT No.: PCT/US2019/030333
§ 371 (c)(1),
(2) Date: Dec. 2, 2019

(87) PCT Pub. No.: WO2019/213355
PCT Pub. Date: Nov. 7, 2019

(65) Prior Publication Data
US 2021/0231387 A1     Jul. 29, 2021

Related U.S. Application Data

(60) Provisional application No. 62/666,562, filed on May 3, 2018.

(51) Int. Cl.
*F28D 20/02* (2006.01)

(52) U.S. Cl.
CPC ................. *F28D 20/023* (2013.01)

(58) Field of Classification Search
CPC ........ F28D 13/00; F28D 17/00; F28D 17/005; F28D 19/00; F28D 19/02; F28D 20/00; F28D 2020/006; F28D 2021/0045; B01J 8/18; B01J 8/1881; F03G 6/06; F03G 2006/061; F03G 2006/062; F03G 6/064; F03G 6/065; F03G 6/067
USPC ................ 165/6, 10, 104.15–104.16, 104.18
See application file for complete search history.

(56) References Cited

U.S. PATENT DOCUMENTS

| | | | | |
|---|---|---|---|---|
| 1,871,166 A | * | 8/1932 | Fahrbach | F23L 15/02 165/5 |
| 1,904,153 A | * | 4/1933 | Lucke | F28D 19/02 110/348 |
| 3,283,810 A | * | 11/1966 | Sonnenschein | B01J 8/087 165/96 |
| 3,814,176 A | * | 6/1974 | Seth | F28B 1/06 165/104.16 |
| 3,831,668 A | * | 8/1974 | Weissenburg | F28C 3/14 165/104.18 |

(Continued)

FOREIGN PATENT DOCUMENTS

DE    10 2015 204 461 A1    9/2016

*Primary Examiner* — Jianying C Atkisson
*Assistant Examiner* — Raheena R Malik
(74) *Attorney, Agent, or Firm* — Daniel J. Jenkins

(57) ABSTRACT

Apparatus for cooling a hot fluid by transferring heat to particles that are then cooled by air.

15 Claims, 2 Drawing Sheets

(56) References Cited

U.S. PATENT DOCUMENTS

| | | | | |
|---|---|---|---|---|
| 4,081,024 A * | 3/1978 | Rush | ............... | F24D 11/007 |
| | | | | 165/62 |
| 4,149,588 A * | 4/1979 | Waters | ............... | F28D 15/0275 |
| | | | | 165/11.1 |
| 4,273,101 A * | 6/1981 | Merges | ............... | F24S 60/10 |
| | | | | 126/643 |
| 4,280,482 A * | 7/1981 | Nilsson, Sr. | ............... | F24S 60/10 |
| | | | | 126/618 |
| 4,306,613 A | 12/1981 | Christopher | | |
| 4,338,919 A * | 7/1982 | Hwang | ............... | F24S 10/30 |
| | | | | 126/644 |
| 4,362,149 A | 12/1982 | Thomson | | |
| 4,499,944 A * | 2/1985 | Komakine | ............... | B01J 8/1836 |
| | | | | 122/4 D |
| 4,904,452 A | 2/1990 | Acharya et al. | | |
| 6,328,099 B1 * | 12/2001 | Hilt | ............... | C05G 5/12 |
| | | | | 165/166 |
| 6,470,834 B1 * | 10/2002 | Hammer | ............... | F22B 1/04 |
| | | | | 122/7 R |
| 8,420,032 B1 | 4/2013 | Ermanoski | | |
| 9,657,723 B1 * | 5/2017 | Iyer | ............... | F03G 6/06 |
| 2009/0277443 A1 * | 11/2009 | Jukkola | ............... | F03G 6/065 |
| | | | | 126/643 |
| 2013/0255667 A1 * | 10/2013 | Ma | ............... | E02D 27/38 |
| | | | | 126/617 |
| 2013/0257056 A1 * | 10/2013 | Ma | ............... | H02K 7/1823 |
| | | | | 290/52 |
| 2013/0284163 A1 | 10/2013 | Flamant et al. | | |
| 2014/0123646 A1 * | 5/2014 | Muren | ............... | F24S 20/20 |
| | | | | 60/641.11 |
| 2014/0298822 A1 | 10/2014 | Ma | | |
| 2014/0311479 A1 * | 10/2014 | Maryamchik | ............... | F28D 13/00 |
| | | | | 126/714 |
| 2015/0204612 A1 * | 7/2015 | Sun | ............... | F28D 1/0233 |
| | | | | 165/104.14 |
| 2015/0253039 A1 | 9/2015 | Erickson et al. | | |
| 2016/0017869 A1 * | 1/2016 | Sakadjian | ............... | F24S 80/20 |
| | | | | 60/641.15 |

\* cited by examiner

SYSTEMS AND METHODS FOR PARTICLE-ENHANCED DRY HEAT REJECTION AND THERMAL STORAGE

CROSS-REFERENCE TO RELATED APPLICATIONS

This application is a U.S. National Stage Filing under 35 U.S.C. § 371 of International Patent Application Serial No. PCT/US2019/030333, filed May 2, 2019, which claims priority to U.S. Provisional Patent Application Ser. No. 62/666,562, filed on May 3, 2018, and entitled, "Systems and Methods for Falling Particle Dry Heat Rejection and Thermal Storage," the disclosures of which are incorporated by reference herein in their entireties.

STATEMENT OF GOVERNMENT INTEREST

The United States Government has rights in this invention pursuant to Contract No. DE-NA0003525 between the United State Department of Energy and National Technology & Engineering Solutions of Sandia, LLC, for the operation of the Sandia National Laboratories.

FIELD OF INVENTION

The present disclosure is generally directed to cooling systems, and more particularly to cooling systems that use particles for heat removal and/or storage.

BACKGROUND

Cooling is a requirement of many industrial processes, including all thermo-electric energy conversion systems that make up greater than 60% of the energy generated in the U.S. The majority of cooling today uses water. However, dry cooling is becoming more important as water is becoming more scarce and costs increase. Dry cooling also enables greater flexibility in plant siting.

Air cooled condensers are the common industrial design for dry cooling design of the common Rankine cycle. They are large and costly in both capital and operating expenses. In them, steam is condensed in fin-tube heat exchangers with fins and large fans on the air side to augment heat transfer. Dry cooling can be 3.5 times more expensive and require much more energy than wet cooling. Also, current dry heat rejection results in elevated power cycle minimum temperatures, decreasing plant efficiency further by about 2% annually, with up to 25% reductions at the hottest time of year, often when full generating capacity is needed most. In techno-economic modeling studies of another energy conversion cycle, the supercritical $CO_2$ ($sCO_2$) recompression closed Brayton cycle, increasing compressor inlet temperature 2° C. over nominal caused the cycle thermal efficiency decreased by 4.6% and levelized cost of electricity (LCOE) increased by 16%. Advanced dry cooling designs have large impacts on both cycle performance and cost for all known thermo-electric power cycles. A need remains for systems and methods that provide dry cooling with improved performance and decreased costs.

SUMMARY OF THE DISCLOSURE

The present disclosure is directed to dry cooling systems and methods that use particles to drastically increase air-side heat transfer for dry cooling. In an embodiment, the systems may be used for the dry cooling of power plants and other industrial processes that require cooling. The systems use moving particles to remove heat from a hot fluid or system through a heat exchanger of some form. This may be a fluidized bed or moving bed heat exchanger, or similar concept. The moving particles are then cooled easily with exposure to air, the ultimate heat sink. Particles enable thermal 'cold' storage that can increase cooling and power cycle efficiencies, especially in arid climates, by cooling particle storage at night. This novel cooling method decreases both capital and operating expenses compared with traditional air-cooled units by a factor of four and two, respectively.

An embodiment of the invention includes a cooling system. The cooling system has a heat transfer structure with one or more heat transfer surfaces, particles in contact with the heat transfer surfaces, and a transport system. The heat transfer structure can include a hot tube bank and/or a fan. The transport system moves the particles through the heat transfer structure and can be an elevator or a conveyor belt. The heat transfer structure can include a particle storage zone, which is preferably below grade. The particle storage zone includes a particle storage bin that may be hyperbolic in shape. The particle storage bin can have one or more internal surfaces to passively conduct heat to external surfaces that can radiate the heat away to the environment. The heat transfer structure can include a shell and plate heat exchanger, a fluidized-bed heat exchanger. The cooling system can be part of and connected to a concentrated solar power system.

Another embodiment of the present invention includes a cooling method which includes contacting moving particles with a heat transfer surface of a member to remove heat from a hot fluid in contact with another surface of the heat transfer member; and passing a fluid through the particles to remove heat from and cool the particles. At least a portion of the particles can then be stored.

One embodiment is a system that includes a solar receiver and a cooling system. The cooling system has a heat transfer structure with one or more heat transfer surfaces and particles that contact the heat transfer surface. There is also a transport system for moving the particles through the heat transfer structure. The particles remove heat from the system.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

The accompanying drawings, which are hereby incorporated into the specification, illustrate one or more embodiments of the present invention and, together with the description, explain the principles of the invention. The drawings are only for illustrating one or more preferred embodiments of the invention and are not to be construed as limiting the invention. In the drawings.

DETAILED DESCRIPTION

Figure 1:
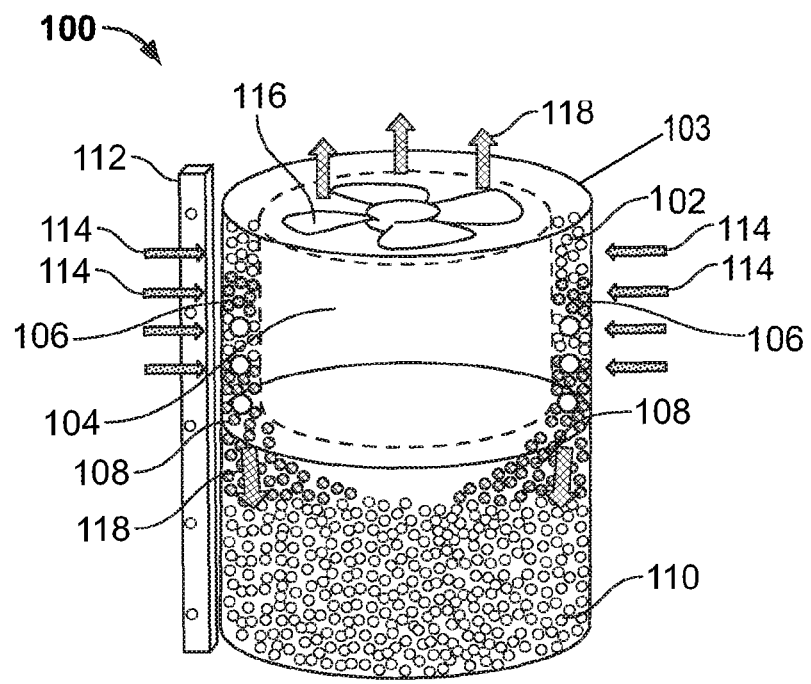
FIG. 1 illustrates a particle-enhanced dry cooling and thermal storage system according to an embodiment of the disclosure.

The present invention is directed to advanced dry cooling systems and methods that improve performance and decrease costs compared with traditional cooling designs. The systems use thermal 'cold' storage for the large daily temperature swings found in arid climates, thereby removing the cycle efficiency penalty during the hottest part of the day, a large advantage over traditional dry cooling. This is especially impactful because the hottest times of day are typically, when electricity demands are highest, and electricity has the most value. Dry cooling can also be used in humid climates, but thermal storage may be less advantageous. The systems of the present invention use falling particles in rising or cross-flowing air to overcome the bottleneck of air-side heat transfer that is common in dry cooling applications. Particles pick up heat from tubes, plates, or similar as they fall by gravity in a moving bed heat exchanger (MBHE), fluidized bed, or similar, such that the heat transfers from the tubes, plates, or similar to the particles thereby improving cooling. In an embodiment of the MBHE, the heat transfer improvement may be by a factor of about 4.7 times over forced convection. After removing heat from the system requiring cooling, the particles are exposed to atmospheric air where their small size has the natural benefit of very large heat transfer coefficients. A fluidized bed approach is another option that has even higher heat transfer performance at the expense of higher complexity and higher operational costs. A cross-flow embodiment may also be advantageous. To complete the particle pathway, an elevator or hoist may be used to raise the particles to repeat the cycle.

The particles may be made of an array of materials including, but not limited to, ceramic, metal, or polymer. Generally, smaller particles improve heat transfer but are harder to contain and transport through the system. Spherical geometry is readily available and is expected perform well and reduce abrasion.

MBHEs have advantages of low parasitic energy use, compactness, and low maintenance costs. An example of their use for heating is in the concentrating solar power (CSP) application where MBHEs heat the power cycle and store energy for power production at times when solar heating is not available. In contrast in the current embodiment, the system is used to cool the power cycle and store cold particles for enhanced cooling during the day. The CSP system includes a solar receiver and the cooling system of an embodiment of the disclosure cools particles that are heated in the solar receiver and then transported to the cooling system. In an embodiment, moving beds may enhance heat transfer by a factor of four compared with forced convection alone and do not require added high pressure gas systems as found with fluidized beds. The MBHE includes a particle bed falling by gravity over a tube bank or series of staggered plates. Compared with tortuous paths that can be used to increase air-side heat transfer, the pressure drop is much smaller for similar performance.

Particles have significant advantages over air-cooled fin-tube heat exchangers including increased heat transfer coefficients in packed moving beds, large total surface area, and large heat capacity. An example method of particle-aided convection of heat removal from a tube bank is shown in FIG. 1. Cooling tower structure 100 resembles a forced air wet cooling tower. The particle bed 102 replaces the evaporative cooling surface around the hot tube bank 104. The particle bed 102 falls while being contained by screens 103 that continuously allow ambient air 114 to flow across the particle bed 102. The cold particles 106 augment heat transfer from the hot tube bank 104 while continuing to fall. The heated particles 108 fall further into particle storage 110 that is below grade to avoid environmental heating. At night, the particle storage 110 may be cooled by ambient air that is drawn through them at low velocity. The fan 116 drawing out hot air 118 at the cooling tower structure 100 top is likely only needed during the hottest part of summer days as natural convection from the particles to air can be very effective. The transport system 112 continuously draws particles from the bottom of storage and lifts them to the top of the MBHE 100. The transport system 112 can be an elevator or a conveyor belt. The transport system 112 can be enclosed or open to lose more heat (i.e., a Magaldi conveyor system). A fan (not shown) can blow ambient air across the conveyor belt in a counter or cross-flow arrangement. The fan preferably remains below the particle entrainment velocity.

The thermal storage could be shaped similar to a hyperbolic natural-draft cooling tower to promote natural convection of the hot particles with cool nighttime air. Radiation heat transfer can also be used to reject heat at night by increasing the exposure (solid angle) of the hot particles to the clear sky either directly or with adjacent surfaces/fins. The effective radiative temperature of a clear sky is well below 0° C. to promote effective heat transfer in arid environments that tend to have few clouds.

In an embodiment, a portion of the particles may be removed from the system for heat recovery and/or preheating purposes, or for additional cooling purposes.

With the proposed systems and methods, for a given cooling requirement at a power plant, the capital equipment is smaller as thermal performance is increased. The MBHE systems and methods are an effective and practical method for increasing convective heat transfer when compared with traditional forced convection.

Figure 2:
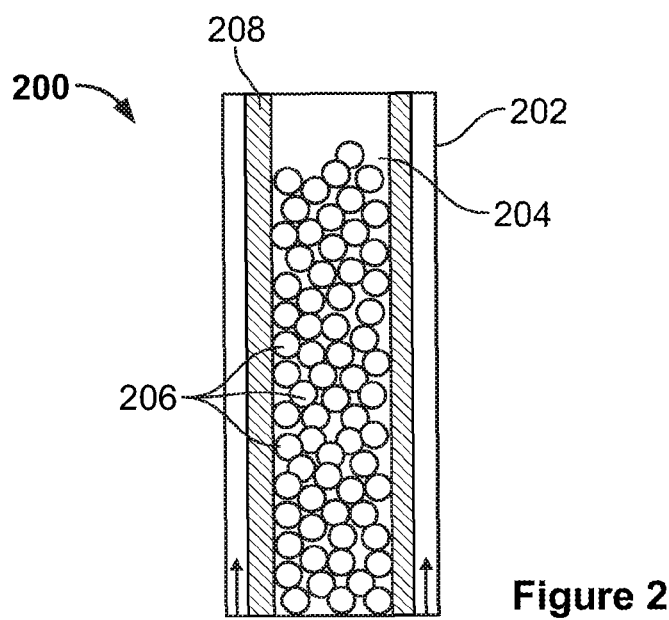
FIG. 2 illustrates a unit section of a MBHE according to another embodiment of the disclosure.

In an embodiment, a MBHE or fluidized bed may be used on the outside of a plate geometry containing the fluid to be cooled. FIG. 2 illustrates a portion of a heat exchanger 200 wherein heat is removed from a power cycle fluid, in a fluid channel 202. Particle channel 204 allows particles 206 to gravity fall thereby removing heat from the fluid in fluid channel 202. Wall 208 separates fluid channel 202 from particle channel 204. In another embodiment, tube banks (not shown) may have advantages for increased mixing and subsequently heat transfer and may be used.

Figure 3:
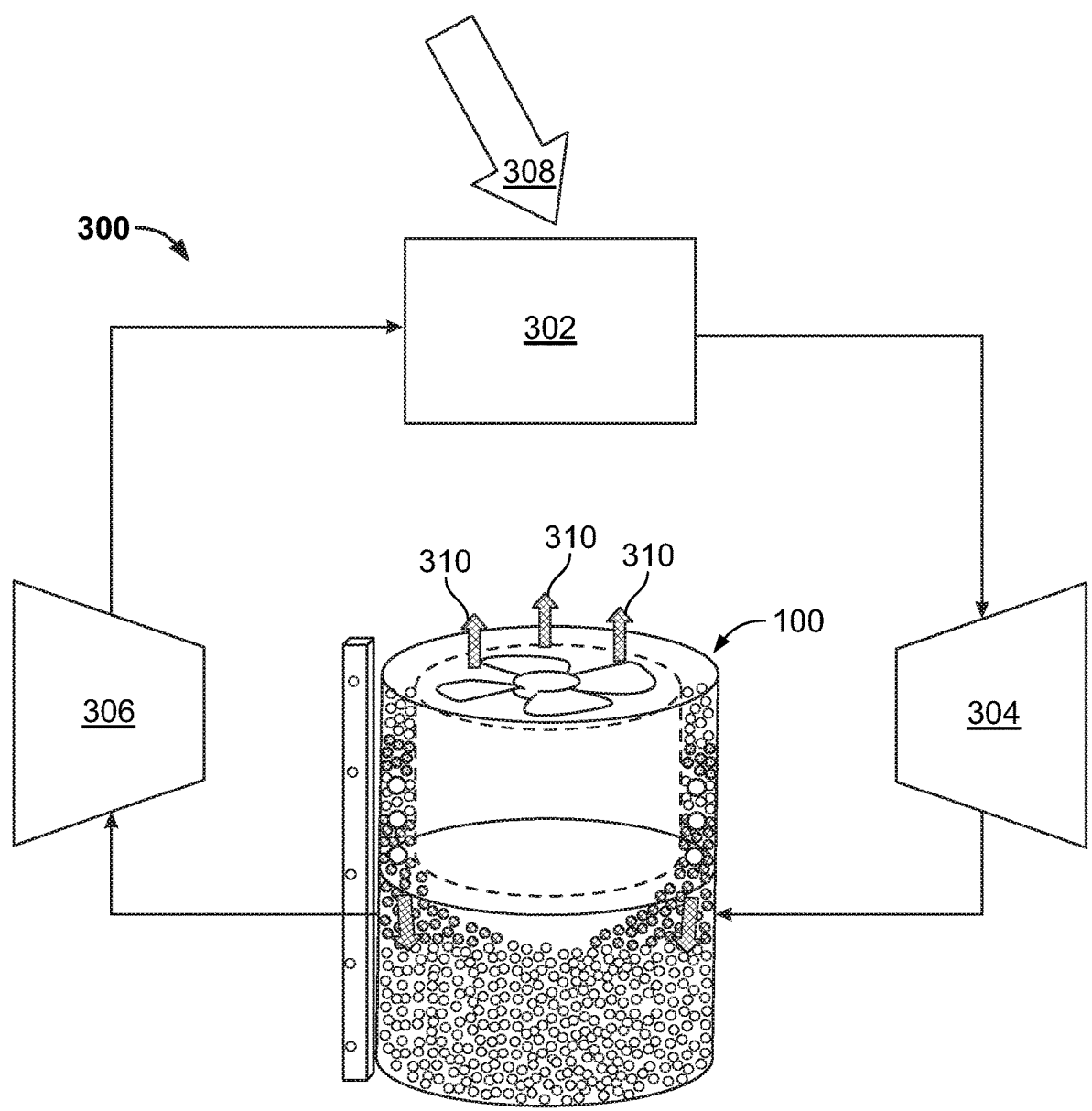
FIG. 3 illustrates a thermo-electric power cycle system according to an embodiment of the disclosure.

Referring to FIG. 3, the closed thermo-electric power system 300 used for electricity generation includes heat 308 added to the system in the heater 302. Energy is extracted in the turbine 304, and residual heat 310 is removed via the particle-enhanced cooling tower structure 100. The fluid pressure is raised in the pump/compressor 306.

The following discussion addresses the convective heat transfer of the MBHE in the shell and plate geometry for easy comparison with commonly accepted empirical correlations, though other configurations may prove advantageous. The analysis assumes the particles fall by gravity but are slowed to achieve desired temperatures without forcing the interstitial gas flow. An example simulation predicts that the particle to wall heat transfer coefficient is 208 W/(m²-K) for panels that are 1-meter high, 50-cm wide with a 6-mm gap. Others have predicted similar heat transfer coefficients for MBHEs of 250-600 W/(m²-K) in small vertical tubes and 150-225 W/(m²-K) around horizontal tube.

In contrast to the MBHE thermal performance, the heat transfer of forced convection of air in the same geometry and thermal conditions is predicted to be 44.6 W/(m²-K), a reduction of 4.66×. In this analysis, the correlation for fully-developed laminar flow between parallel plates with constant wall temperature is used.

$$Nu_D = hD_h/k = 7.54.$$

Consistent geometry was used for the comparison and air properties were evaluated at elevated conditions of 1050 K and atmospheric pressure. The intermediate values were $$D_h = 4A_c/P = 4LW/2(L+W) = 0.0119 \text{ m},$$

$$k \text{ of air @ 1050K and 1 atm} = 0.0702 \text{ W/mK'}$$

$$h = Nu_D k/D_h = 7.51(0.0702 \text{ W/mK})/0.0119 \text{ m} = 44.6 \text{ w/m}^2\text{K}.$$

Laminar flow is a good assumption for this small 6-mm gap and is valid for average air velocities up to 34.1 m/s (76.3 mph).

As detailed previously, moving packed beds in MBHEs produce much higher heat transfer coefficients than forced air and require no forced air at all, just particles falling by gravity. The predicted increase in heat transfer will allow for the same heat exchange in a smaller area, reducing capital expenses by a similar ratio.

Reduced operating expense claims are substantiated by a reduction in parasitic energy use. Traditional dry cooling units require large cooling fans to force air over fin-tube heat exchangers. In a conventional example of an operating plant, the steam bottoming cycle of a natural gas combined cycle is cooled by a hybrid wet-dry cooling system with dry accounting for 60% of the load. Approximately 10% of the dry-cooled portion of electricity generated by the steam bottoming cycle goes to drive the fans during the summer, a very large parasitic energy load.

Another benefit of MBHEs is that the energy required to lift particles is very small when compared with that to force air at high to moderate velocity. This allows for reduced operating expenses as parasitic energy can be greatly reduced. Some energy may be required to force air to cool the particles, but it can be minimized because particles have excellent convection performance and the particle heating can be done by a MBHE.

In contrast to the approximately 10% parasitic energy required in the convectional example, the energy to lift particles will likely be about 0.61% of the electrical power output. The work below outlines basic predictions leveraging concentrated solar power (CSP) particle lifting understanding.

Considering a theoretical 50 MWe plant with 50% thermal efficiency, the cooling requirement is $Q_{cool}=50 \text{ MW}_{th}$. We will estimate the energy required to lift the particles 10 meters with a lift efficiency of 45% (commonly accepted value). Defining properties, the specific heat capacity of ceramic particles is $c_p=1.2$ kJ/(kg-K) and temperature drop is $\Delta T=30°$ C. The particle mass flow required is $$\dot{m}' = Q_{cool}/(c_p \Delta T) = 1389 \text{ kg/s}.$$

The lifting power is $$P_{lift} = \frac{\dot{m}gh}{\eta} = 302.9 \text{ kW}.$$

The relative lift power to electrical power is therefore $$\frac{P_{lift}}{P_{elec}} = \frac{302.9 \text{ kW}}{50,000 \text{ kW}} = 0.61\%$$

which is a 16× reduction in the parasitic energy of the dry cooling solution in the convectional example at Afton Power Generating Station in Afton, NM. As mentioned previously, the particles may have to be cooled by forced air, but the increased thermal performance will likely drive the parasitic energy requirement up to about ⅓ of that of traditional dry coolers. This decrease in parasitic energy should, in concert with other beneficial impacts, help reduce operational expenses by a factor of two.

Thermal storage increases cycle efficiency by maintaining lower cold side fluid temperatures during periods of high air temperature. This is accomplished by using colder particles to effectively cool during the day and warmer particles to reject heat at night. The system is suited for arid climates where water is least available because air temperatures have larger daily swings.

In an embodiment, the system can easily be extended to a hybrid cooler that uses small amounts of water with the moving bed when the air temperatures are especially high. Traditional wet cooling units have water scale buildup that requires shutdowns and maintenance. This hybrid concept can reduce water scale as the particles naturally lend themselves to abrasive scale removal, reducing maintenance costs. This self-cleaning effect would maintain performance and reduce required maintenance and shut-down periods.

In CSP applications, ceramic particles are typically used for stability at high temperatures. The temperatures in cooling are generally less than 140° F., so metals, polymers, or other materials can be used, offering a large range of options. Metals possess several desirable attributes including high thermal conductivity, high heat capacity, and high mass density.

In the invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure.

What is claimed is:

1. A cooling system, comprising:
   a heat transfer structure comprising a hot tube bank;
   a plurality of solid particles dropping past and surrounding the hot tube bank;
   a screen containing the plurality of particles surrounding the hot tube bank;
   a particle storage zone below the hot tube bank for receiving the solid particles; and
   a transport system for moving the plurality of solid particles from the particle storage zone to the top of the heat transfer structure to allow the plurality of solid particles to flow through and recirculate through the heat transfer structure;
   wherein the particle storage bin comprises one or more internal surfaces to passively conduct heat to external surfaces that can radiate the heat away to the environment.

2. The system of claim 1, wherein the particle storage zone is below grade.

3. The system of claim 1, wherein the particle storage zone comprises a particle storage bin.

4. The system of claim 1, wherein the particle storage zone is hyperbolic in shape.

5. The system of claim 1, wherein the heat transfer structure comprises a tube bank.

6. The system of claim 1, further comprising a fan disposed on the heat transfer structure.

7. The system of claim 1, wherein the transport system comprises an elevator.

8. The system of claim 1, wherein the transport system comprises a conveyor belt.

9. The system of claim 1, wherein the heat transfer structure is a shell and plate heat exchanger.

10. The system of claim 1, wherein the heat transfer structure is a fluidized-bed heat exchanger.

11. The system of claim 1, wherein the cooling system is connected to a concentrated solar power system.

12. The system of claim 1, wherein the plurality of solid particles are selected from the group consisting essentially of ceramic, metal and polymer solid particles.

13. A cooling method, comprising:
    bringing a plurality of moving solid particles in contact with a heat transfer surface of a member by allowing the solid particles to fall under gravity adjacent to the heat transfer surface to remove heat from a hot fluid in contact with another surface of the member;
    cooling the plurality of moving solid particles with ambient air as the plurality of solid particles are removing heat from the hot fluid; and
    recirculating the plurality of solid particles after they fall under gravity to bring the plurality of solid particles again in contact with the heat transfer surface.

14. The method of claim 13, further comprising storing at least a portion of the plurality of particles.

15. A system comprising:
    a solar receiver; and
    a cooling system, wherein the cooling system comprises:
       a tube bank comprising a heat transfer structure comprising first and second heat transfer walls having corresponding first and second heat transfer surfaces;
       a plurality of solid particles in contact with the first and second heat transfer surfaces;
       a screen in contact with the plurality of solid particles that allows ambient air to contact the solid particles; and
       a transport system for the plurality of solid particles through the heat transfer structure;
       wherein the plurality of solid particles remove heat from the tube bank.

\* \* \* \* \*